D. F. BEEGLE.
GRAIN BIN.
APPLICATION FILED APR. 14, 1916.
1,222,516.
Patented Apr. 10, 1917.
2 SHEETS—SHEET 1.
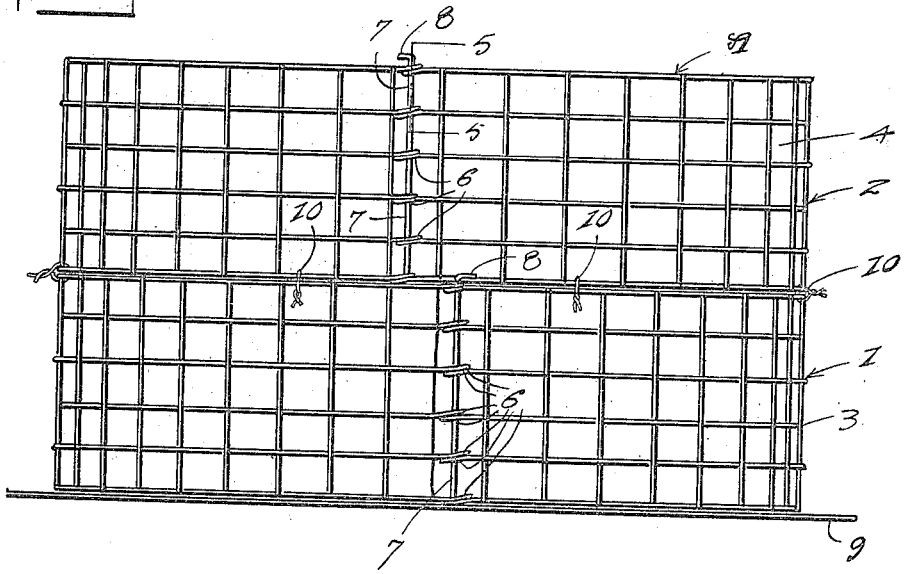
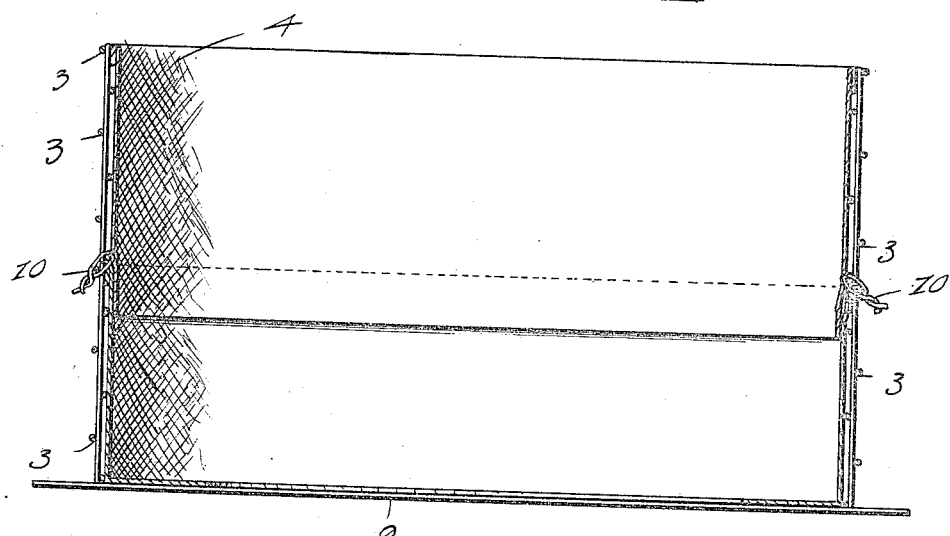
Witnesses
C. R. Bealle.
James J. Donegan.
Inventor
D. F. Beegle.
By A. Randolph Jr.
Attorney

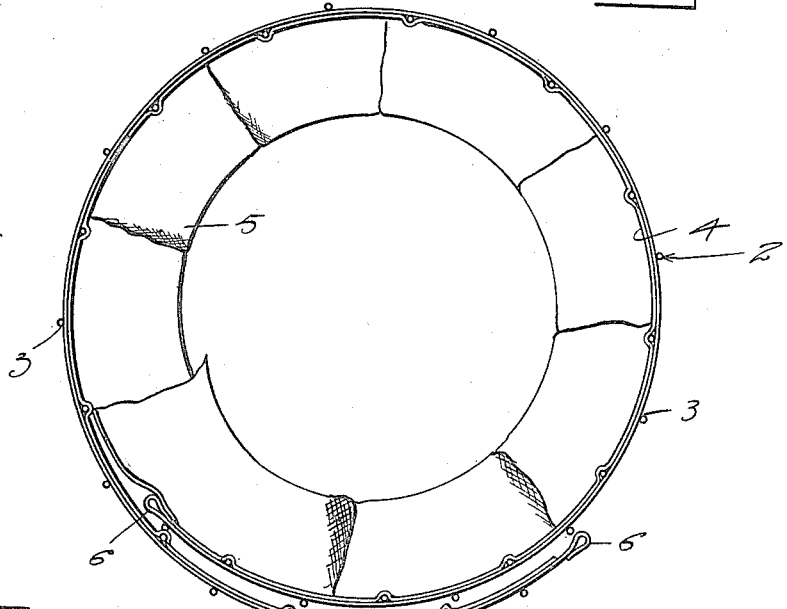
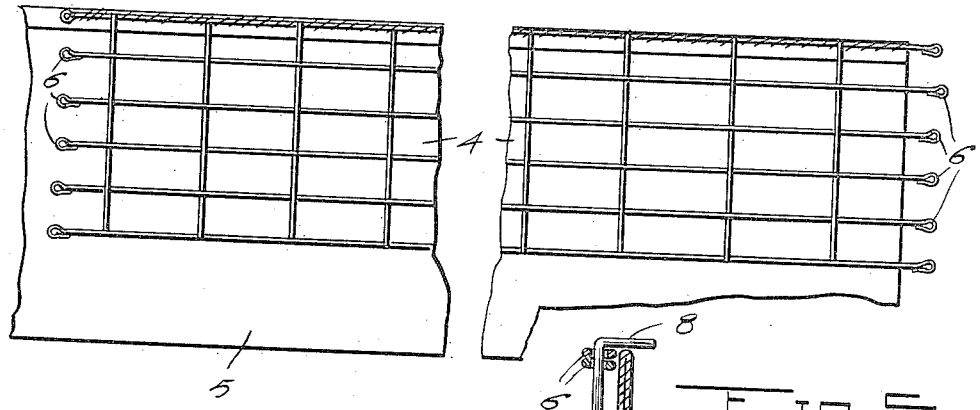

UNITED STATES PATENT OFFICE.

DANIEL F. BEEGLE, OF WAITSBURG, WASHINGTON.

GRAIN-BIN.

1,222,516.  Specification of Letters Patent.  Patented Apr. 10, 1917.

Application filed April 14, 1916. Serial No. 91,255.

*To all whom it may concern:*

Be it known that I, DANIEL F. BEEGLE, a citizen of the United States, residing at Waitsburg, in the county of Walla Walla and State of Washington, have invented certain new and useful Improvements in Grain-Bins; and I do hereby declare the following to be a full, clear, and exact description of the invention, such as will enable others skilled in the art to which it appertains to make and use the same.

The primary object of this invention is to provide a portable and knockdown grain bin, for holding grain, and of such simple construction that the same can be manufactured cheaply and can be conveniently and expeditiously placed in operative position or taken down, as desired.

Another object of the invention is to provide a grain bin composed of a plurality of flexible and detachable sections, each of which can be rolled up into a compact mass, after the same has been detached, so as to occupy a minimum amount of space when stored away.

Other objects will appear and be better understood from that embodiment of my invention of which the following is a specification, reference being had to the accompanying drawings forming a part thereof, in which:

Figure 1 is a front elevation of the bin, in operative position,

Fig. 2 is a vertical section taken through the same,

Fig. 3 is a detail section taken through the meeting ends of one of the sections, showing the manner of securing the meeting ends together, Fig. 4 is a top plan view of one of the sections removed and in folded position, Fig. 5 is a section taken on the line 5—5 of Fig. 1, Fig. 6 is a detail sectional view of one of the sections in opened or unfolded position.

Referring to the drawing in detail, the letter A designates the grain bin adapted to be built up of a plurality of superposed sections, only two sections being shown in the drawings, but it is to be understood that as many sections as found to be necessary can be employed. The sections shown in the drawings are designated by the numerals 1 and 2, respectively, and each is formed of flexible material, so that when the section is detached from operative position the same can be rolled up and stored away for future use. Each section includes, preferably, an outer shell of meshed wire 3 and an inner lining of canvas 4. The canvas 4 covers the entire inner surface of the shell 3 and has its upper edge secured to the upper edge of the shell, in any suitable manner, and the lower edge of the canvas is free, as shown at 5, and depends below the lower edge of the shell. The ends of the shell are provided with eyes 6 and when the section is in operative position the eyes on one end alternate with the eyes on the opposite end and all of the eyes lie in vertical alinement, and receive a locking rod 7, so as to hold the ends of the shell secured, the upper end rod 7 being bent laterally to provide a stop 8, which overlies the uppermost eye and limits downward movement of the rod 7.

In use, a piece of canvas, designated 9, is placed on the ground, adjacent the grain separater, not shown, so as to provide a bottom for the bin, and one of the sections of which the bin is composed is placed on the canvas, as shown in Fig. 2. The depending lower edge of the lining 4 of the bin section resting on the canvas 9 is turned inwardly, as shown in Fig. 2, and superposed on the canvas 9. If one section will not be sufficient to hold all of the grain to be stored, another section can be superposed on the first-mentioned section, as shown in the drawings, and so on until a bin large enough is provided to hold all of the grain to be stored. When a plurality of sections are arranged in superposed relation, the depending edge 5 of the lining 4 of one section extends into the interior of the adjacent lower section, as shown in Fig. 2, and engages the inner surface thereof and covers the joint between the sections. Wire clips 10 can be employed to hold the adjacent sections secured to each other. Each of the clips consists of a piece of wire adapted to be twisted around the opposed edges of adjacent sections.

After the grain has been removed from the bin, the sections employed to form the bin can be detached and rolled up, as shown in Fig. 4, so as to provide a comparatively small mass that can be readily stored in a minimum amount of space.

Having thus described my invention what I claim as new is:

1. A bin of the class described comprising, a body formed of a plurality of superposed and flexible sections, each consisting of an outer shell and a lining located on the inner side of the shell, and means for detachably connecting the sections to each other.

2. A bin of the class described comprising, a body formed of a plurality of superposed flexible sections, each consisting of an outer shell and a lining positioned on the inner side of the shell, the lower edges of the linings on the sections extending below the lower edges of the sections and the lower edge of the lining on one section extending into the interior of the next adjacent lower section.

3. A bin of the class described comprising, a flexible bottom wall, a shell removably mounted on the bottom wall, a lining located on the inner surface of the shell, and an extension carried by the lower end of the lining and resting on the upper side of the bottom wall.

In testimony whereof I affix my signature in presence of two witnesses.

DANIEL F. BEEGLE.

Witnesses:
W. H. WALLACE,
J. E. BUTLER.

Copies of this patent may be obtained for five cents each, by addressing the "Commissioner of Patents, Washington, D. C."